United States Patent
Champlin et al.

(10) Patent No.: US 7,025,820 B2
(45) Date of Patent: Apr. 11, 2006

(54) METHOD FOR FORMING AN AQUEOUS CARBON BLACK DISPERSION

(75) Inventors: Tabb Robertson Champlin, Ambler, PA (US); Stephen Andrew Crescimanno, Hatfield, PA (US); Eric Jon Langenmayr, Bryn Mawr, PA (US); Richard Shu-Hua Wu, Fort Washington, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 10/700,079

(22) Filed: Nov. 3, 2003

(65) Prior Publication Data

US 2004/0103822 A1    Jun. 3, 2004

Related U.S. Application Data

(60) Provisional application No. 60/425,128, filed on Nov. 8, 2002.

(51) Int. Cl.
- *C09D 11/00* (2006.01)
- *C09C 1/22* (2006.01)
- *C01F 7/02* (2006.01)

(52) U.S. Cl. .................... 106/31.9; 106/31.6; 106/473; 106/480; 423/600

(58) Field of Classification Search ............... 106/31.6, 106/31.9, 473, 480; 423/600
See application file for complete search history.

(56) References Cited

FOREIGN PATENT DOCUMENTS

| | | | |
|---|---|---|---|
| EP | 1243623 | | 9/2002 |
| EP | 1418209 A2 | * | 5/2004 |
| JP | 1998-128505 | * | 5/1998 |
| JP | 11148027 | | 6/1999 |
| JP | 2001-294776 | * | 10/2001 |
| JP | 2001294776 | | 10/2001 |
| JP | 2004197076 A | * | 7/2004 |

OTHER PUBLICATIONS

Kuwahara et al.; Studies on Pigment Dispersion in Water. Kinki Univerwsity, Coloring Materials (Shokuzai) 45, 181 (1972) (683-642).*

Kuwahara et al.; Studies on Pigment Dispersion in Water. III Wet Oxidation Of Carbon Black And Dispersibility In Water; *Dept of Applied Chemistry, Faculty Of Science and Engineering, Kinki University*; Coloring Materials (Shokuzai) 45, 181 (1972) (683-642).

Papirer E. et al,; Chemical Modifications and Surface Properties of Carbon Blacks; Carbon, Elsevier Science Publishing, New York, NY, US,; vol. 34, No. 12 pp. 1521-1529, (1996).

* cited by examiner

*Primary Examiner*—J. A. Lorengo
*Assistant Examiner*—Veronica F. Faison
(74) *Attorney, Agent, or Firm*—Karl Stauss

(57) ABSTRACT

A method for forming an aqueous carbon black dispersion including providing a reaction mixture including carbon black having a DBP uptake of greater than 90 cc/100 g of the carbon black, a monovalent ion persulfate, an aqueous medium, and, in some embodiments, a strong acid; subjecting the reaction mixture to a first temperature of from 40° C. to 90° C. for from 2 hours to 24 hours; neutralizing the reaction mixture to a pH greater than 7.0, and, in certain embodiments, subjecting the neutralized reaction mixture to a second temperature of from 20° C. to 40° C. higher than the first temperature for from 2 hours to 12 hours is provided. In an alternative aspect carbon black having a particle diameter less than 18 nanometers in diameter and a DBP uptake of less than 70 cc/100 g carbon black is provided. The aqueous carbon black dispersion so formed and an aqueous inkjet ink containing the aqueous carbon black dispersion are also provided.

11 Claims, No Drawings

METHOD FOR FORMING AN AQUEOUS CARBON BLACK DISPERSION

CROSS REFERENCE TO RELATED PATENT APPLICATIONS

This is a non-provisional patent application of co-pending U.S. provisional patent application Ser. No. 60/425,128 filed Nov. 8, 2002.

This invention relates to a method for forming an aqueous carbon black dispersion. In particular the invention relates to a method for forming an aqueous carbon black dispersion by providing a reaction mixture including carbon black having a DBP uptake of greater than 90 cc/100 g of the carbon black, a monovalent ion persulfate, and an aqueous medium; subjecting the reaction mixture to a first temperature of from 40° C. to 90° C. for from 2 hours to 24 hours; and neutralizing the reaction mixture to a pH greater than 7.0. In another aspect the invention relates to the method wherein the carbon black has a primary particle diameter of less than about 18 nanometers and a DBP uptake of less than 70 cc/100 g of the carbon black. An aqueous carbon black dispersion prepared by the method of this invention and an aqueous inkjet ink including the dispersion are also provided.

In aqueous inks, toners, paints, and coatings, carbon black is not suitable for use in the form in which it is produced because it is inherently a hydrophobic material and, therefore, difficult to stably disperse in water. Surface modification, including adsorption of dispersants on the particle surface and oxidation of the carbon black, can result in an aqueous carbon black dispersion which is useful for the previously mentioned uses. Various methods of oxidizing the surface of carbon black including gas phase oxidation and liquid phase oxidation have been disclosed. Specific chemical oxidation agents that have been used include ozone, hydrogen peroxide, sodium hypochlorite, nitric acid, and potassium permanganate. These oxidizing agents are effective but in each case there are significant disadvantages including the formation of hazardous emissions or toxic byproducts. There is a clear need for an effective process to oxidize organic pigments such as carbon black without the disadvantages cited above.

T. Kuwahara, et al., "Coloring Materials (Shokuzai)", 45, 181(1972) discloses the wet oxidation of furnace black with, inter alia, ammonium persulfate, at 55° C., followed by washing, centrifuging, drying, and pulverizing.

It is still desired to provide a method for forming a more stable aqueous carbon black dispersion. There is a need for stable colloidal carbon black pigment dispersions as colorants for aqueous ink jet inks which jet reliably and give high quality, high optical density prints on a wide range of paper types. That is, high optical density, as well as high solid area uniformity should be obtained with both high quality ink jet paper as well as cheap, lower quality plain paper.

There is also a need for ink jet inks which dry fast and still yield high optical density prints with high solid area uniformity. Fast dry ink formulations are needed for high speed ink jet printers. If the ink is not dry by the time the next printed sheet is fed onto the previously printed sheet, then strikeoff can occur and smearing. Commercially available self-dispersed carbon black dispersions can give significantly decreased optical density in fast dry ink formulations.

There is also a need for inkjet inks which provide prints which have high gloss and high resolution when applied to photographic grade inkjet papers.

In a first aspect of the present invention there is provided a method for forming an aqueous carbon black dispersion comprising: providing a reaction mixture comprising carbon black having a DBP uptake of greater than 90 cc/100 g of said carbon black, a monovalent ion persulfate, and an aqueous medium; subjecting said reaction mixture to a first temperature of from 40° C. to 90° C. for from 2 hours to 24 hours; and neutralizing said reaction mixture to a pH greater than 7.0.

In a second aspect of the present invention there is provided a method for forming an aqueous carbon black dispersion comprising: providing a reaction mixture comprising carbon black having a primary particle diameter of less than abour 18 nanometers and a DBP uptake of less than 70 cc/100 g of said carbon black, a monovalent ion persulfate, and an aqueous medium; subjecting said reaction mixture to a first temperature of from 40° C. to 90° C. for from 2 hours to 24 hours; and neutralizing said reaction mixture to a pH greater than 7.0.

In a third aspect of the present invention there is provided an aqueous carbon black dispersion prepared by the method of the first aspect of the present invention.

In a fourth aspect of the present invention there is provided an aqueous inkjet ink comprising the aqueous carbon black dispersion of the second aspect of the present invention.

The reaction mixture of the first aspect of the method of this invention includes carbon black having a DBP uptake of greater than 90 cc/100 g of the carbon black. Carbon black is the generic name for small particle size carbon particles formed in the gas phase by the thermal decomposition of hydrocarbons and includes, for example, materials known in the art as furnace black, lampblack, channel black, acetylene black. The structure of carbon black is commonly indicated by the dibutyl phthalate (DBP) uptake of the carbon black as determined by ASTM test proceedure D2414. Suitable carbon blacks are available as PRINTEX™ U (Degussa-Huls Corp., Ridgefield Park, N.J.), VULCAN™ 6, VULCAN™ 9, MONARCH™ 880, and BLACK PEARLS™ 570 (preceeding four carbon blacks are all from Cabot Corp., Billerica, Mass.). Carbon black is included in the reaction mixture at a level of from 1% to 30%, preferably 5% to 20%, by weight based on the weight of the reaction mixture.

The reaction mixture of the second aspect of the method of this invention includes carbon black having a primary particle diameter of less than about 18 nanometers, preferably 16 nanometers, and a DBP uptake of less than 70 cc/100 g, preferably less than 60 cc/100 g, of the carbon black. A suitable carbon black is PRINTEX™ 85 (DBP uptake=48 cc/100 g carbon black, primary particle diameter=16 nm). Carbon black is included in the reaction mixture at a level of from 1% to 30%, preferably 5% to 20%, by weight based on the weight of the reaction mixture.

The reaction mixture of the method of this invention includes a monovalent ion persulfate. Suitable persulfates include ammonium persulfate, sodium persulfate, and potassium persulfate. The monovalent ion persulfate is included in the reaction mixture at a level of from 1% to 30%, preferably 5% to 20%, by weight based on the weight of the reaction mixture.

The reaction mixture of the method of this invention includes an aqueous medium by which is meant herein a single phase liquid including greater than 50% by weight water, based on the weight of the medium. Other components of the aqueous medium are typically water-miscible compounds such as ethylene glycol and isopropanol.

The carbon black is insoluble in the aqueous medium so that the reaction medium is typically a dispersion of carbon black in an aqueous solution of a monovalent ion persulfate; the dispersion is typically not stable without agitation.

In the method of this invention the reaction mixture is subjected to a first temperature of from 40° C. to 90° C. for from 2 hours to 24 hours. Preferably the reaction temperature is maintained at 50° C. to 75° C. for from 2 hours to 24 hours. However, it is further contemplated that various temperature profiles can be effected in this step; by "a first temperature of from 40° C. to 90° C." is meant herein the average elevated temperature weighted by the time at each temperature to which the reaction mixture is subjected.

In one embodiment of the method of this invention the reaction mixture further includes a strong acid such as, for example, sulfuric acid, hydrochloric acid, p—toluenesulfonic acid, and methane sulfonic acid. Typically, an inorganic acid such as, for example, sulfuric acid is used. The strong acid is included in the reaction mixture at a level of from 0% to 30%, preferably 5% to 10%, by weight based on the weight of the reaction mixture.

In the method of this invention the reaction mixture, subsequent to subjecting it to a first temperature of from 40° C. to 90° C. for from 2 hours to 24 hours, is neutralized to a pH of greater than 7.0. Typically the neutalization is effected after the reaction mixture has been cooled or been allowed to cool to a temperature lower than 40° C., but this is not critical to the practice of the method. The neutralization is effected with a base, typically a nonvolatile inorganic base such as sodium hydroxide or potassium hydroxide to provide the aqueous carbon black dispersion of this invention.

The steps of the method of this invention are typically effected with stirring or mixing. Batch, semi-continuous, or continuous processes can be used.

In one embodiment of the method of this invention, after the neutralization step, the neutralized reaction mixture is subjected to a second temperature which is from 20° C. to 40° C. higher than the first temperature for a period of from 2 hours to 12 hours. A closed reaction system rated for pressure is required in some cases. If the first or second temperature treatments are not effected at a constant temperature, a time weighted average temperature is meant herein as described above.

In one embodiment of the method of the invention an anionic or nonionic stabilizer is added. By "anionic or nonionic stabilizer" is meant a surfactant or dispersant which is nonionic or anionic at the pH greater than 7.0 to which the reaction mixture is neutralized. Without being bound by a particular theory, it is believed that such stabilizers can become adsorbed on the particulate carbon black in an amount effective to enhance its stability. Suitable stabilizers include nonionic surfactants such as TERGITOL™ 30 (Union Carbide Corp., Danbury, Conn.) and dispersants such as TAMOL™ 731 (Rohm and Haas Company, Philadelphia, Pa.). The stabilizer can be included in the reaction mixture if it is stable to oxidation or before or after the neutralization step. The stabilizer is added at a level of from 0% to 5%, preferably from 0.5% to 2.5%, more preferably from 0.5% to 1.0%, by weight based on carbon black weight.

The aqueous carbon black dispersion of this invention is prepared by the method of this invention. It is desirably stable in long term storage such as 1–2 years and also stable during the preparation of coatings, inks, and the like containing the dispersion. The viscosity of the carbon black dispersion is low and typically ranges from 1.0 to 10.0 centipoise for a dispersion containing dispersed carbon black at about 15 wt % solids. The surface tension of the carbon black dispersion is high and ranges from ca. 68 to 72 dynes/cm, but can be lower if a stabilizer is also used.

Ink jet printing inks are an increasingly important segment of the printing ink industry. The ink for ink jet printers is emitted through one or more small orifices or nozzles onto a substrate. In the case of continuous ink jet (CIJ) printing, a continuous thin stream of ink is ejected under pressure through the printhead orifices, and broken up into a continuous stream of uniform droplets at a fixed distance. Other ink jet printing processes, known as drop on demand processes, expel droplets from printhead orifices specifically when they are needed. Drop-on-demand (DOD) processes initiate droplet formation through a variety of methods. The most common method is through the use of heat to vaporize water in the ink chamber resulting in a gas bubble which in turn ejects ink from the chamber when needed. Another common process involves the ejection of the ink droplet due to the reduction in ink chamber volume as a result of the deformation of a piezoelectric crystal.

Both CIJ and DOD processes can be used to apply inks based on dyes or pigments, including carbon black, that contain, among other things, resins, water, solvents, surfactants and other additives. Due to the small orifice size of the printhead nozzles, having stable dispersions that do not leave deposits at the nozzle entrance, nor in the thermal chamber is important.

The aqueous inkjet ink of this invention can contain one or more colorants in addition to the carbon black dispersion of this invention. Such colorants can be selected from the group of pigments and dyes generally useful in ink jet printing. Suitable organic pigments include non-oxidized carbon black, azo compounds, phthalocyanine pigments, quinacridone pigments, anthraquinone pigments, dioxazine pigments, indigo, thioindigo pigments, perynone pigments, perylene pigments, and isoindolene. Suitable inorganic pigments include titanium dioxide, iron oxide, and other metal powders. Generally, the total amount of pigment(s) used is less that 10%, preferably 3–8%, by weight based on the total weight of the ink. The pigment particle size must be sufficiently small that pigment particles will not clog the nozzles on the printing device in which the ink is to be used. Typical nozzle openings on thermal ink jet printers are 30–60 microns in diameter. Preferably, the pigment particle size is from 0.05 to 2 microns, more preferably not more than one micron and most preferably not more than 0.3 microns.

In one embodiment the inkjet ink includes a polymeric binder, preferably an emulsion polymer, i.e., an emulsion-polymerized addition polymer. Preferably the emulsion polymer is present at a level of 0.1 to 10%, more preferably 1 to 5%, by weight based on the weight of the ink. The preparation of emulsion-polymerized addition polymers by batch, semi-batch, gradual addition, or continuous processes are well known to those skilled in the art, for example, as described in EP 747,456 A.

The inkjet ink of this invention can also include water miscible or soluble materials such as humectants, dispersants, penetrants, chelating agents, cosolvents, defoamers, buffers, biocides, fungicides, viscosity modifiers, bactericides, surfactants, anti-curling agents, anti-bleed agents and surface tension modifiers, all as is known in the art. Useful humectants include ethylene glycol, 1,3-propanediol, 1,4-butanediol, 1,4-cyclohexanedimethanol, 1,5-pentanediol, 1,6-hexanediol, 1,8-octanediol, 1,2-propanediol, 1,2-butanediol, 1,3-butanediol, 2,3-butanediol, diethylene glycol, triethylene glycol, tetraethylene glycol, polyethylene glycol with average molecular weight of 200, 300, 400, 600, 900, 1000, 1500 and 2000, dipropylene glycol, polyproylene glycol with average molecular weight of 425, 725, 1000, and 2000, 2-pyrrolidone, 1-methyl-2-pyrrolidone, 1-methyl-2-piperidone, N-ethylacetamide, N-methlpropionamide, N-acetyl ethanolamine, N-methylacetamide, formamide, 3-amino-1,2-propanediol, 2,2-thiodiethanol, 3,3-thiodipropanol, tetramethylene sulfone, butadiene sulfone, ethylene carbonate, butyrolacetone, tetrahydrofurfuryl alcohol, glycerol, 1,2,4-butenetriol, trimethylpropane, pantothenol, Liponic EG-1. Preferred humectants are polyethylene glycol with average molecular weight of 400 to 1000, 2-pyrrolidone 2, 2 thiodiethanol, and 1,5 pentanediol. Preferred penetrants include n-propanol, isopropyl alcohol, 1,3-propanediol, 1,2-hexanediol, and hexyl CARBITOL™ (Union Carbide Corp.). The amount of humectant used can range from 0% to 30%, preferably 5% to 15%, by weight, based on the total weight of the ink.

The amount of defoaming agent in the ink typically ranges from 0% to 0.5% by weight, based on the total weight of the ink. Defoaming agents useful in forming aqueous dispersions of pigments are well known in the art and commercially available examples include Surfynol 104H and Surfynol DF-37 (Air Products, Allentown, Pa.).

The inkjet inks of the present invention can be prepared by any method known in the art for making such inks, for example, by mixing, stirring or agitating the ingredients together using any art-recognized technique to form an aqueous ink. The procedure for preparation of the inkjet ink of the present invention is not critical except to the extent that the ink composition is homogenous.

The inkjet inks including carbon black dispersions formed by the method of the first aspect of this invention are useful for jetting reliably and providing high quality, high optical density prints on a wide range of paper types in fast dry as well as slow dry ink formulations. The inkjet inks including carbon black dispersions formed by the method of the second aspect of this invention are useful for jetting reliably and providing prints, particularly on photographic grade in jet paper, that exhibit high gloss and high resolution.

The following examples are presented to illustrate the invention.

EXAMPLE 1

Formation of Aqueous Carbon Black Dispersion 2000 g deionized ("DI") water was charged to a glass reaction kettle and the overhead stirrer was set to get good surface movement. 372 g potassium persulfate was charged to the stirred water in the reactor. 225 g carbon black (PRINTEX™ U; DBP uptake=115 cc/100 g of carbon black) was charged to the reactor and the reactor temperature was brought to 43° C. After the temperature was reached, 128.7 g sulfuric acid was subsurface charged to the reactor and the reactor walls were rinsed with 325 g DI water. The reactor temperature rose to 55° C. and was maintained at 55° C. for 10 hours. Then the reactor was cooled to less than 35° C. Potassium hydroxide was added to adjust the pH to between 8 and 10. The resultant dispersion of carbon black particles was cooled to room temperature, diluted 3- to 4-fold with DI water, and filtered through a 140 mesh stainless steel screen. The filtered dispersion was treated by ultrafiltration to remove water phase inorganic and organic salts. The particle size (Microtrac UPA 150 particle size analyzer), percent solids, viscosity, surface tension, pH, and conductivity of the dispersion was measured.

EXAMPLE 2

Formation of Carbon Black Dispersion 2000 g DI water was charged to a glass reaction kettle and the overhead stirrer was set to get good surface movement. 372 g potassium persulfate was charged to the stirred water in the reactor. 225 g carbon black (PRINTEX™ U; DBP uptake=115 cc/100 g of carbon black) was charged to the reactor and the reactor temperature was brought to 43° C. After the temperature was reached, 128.7 g sulfuric acid was subsurface charged to the reactor and the reactor walls were rinsed with 325 g DI water. The reactor temperature rose to 55° C. and was maintained at 55° C. for 10 hours. Then the reactor was cooled to less than 35° C. Potassium hydroxide was added to adjust the pH to between 8 and 10. The resultant dispersion of carbon black particles was then heated to 90° C. and held at that temperature for 10 hours. After the hold period, the reaction mixture was cooled to room temperature, diluted 3- to 4-fold with DI water, and filtered through a 140 mesh stainless steel screen. The filtered dispersion was treated by ultrafiltration to remove water phase inorganic and organic salts. The particle size (Microtrac UPA 150 particle size analyzer), percent solids, viscosity, surface tension, pH, and conductivity of the dispersion was measured.

EXAMPLES 3–7 AND COMPARATIVE EXAMPLES A–C

Formation and Stability of Carbon Black Dispersions

The dispersions of Examples 3–7 and Comparative Examples A–C were prepared according to the processes of Examples 1–2 with the changes indicated in Table 3.1. The 12 month stability of the carbon black dispersion was simulated by aging at 80° C. for one week. Failure in stability test is defined as greater than 10% growth in the median volume particle size of the carbon black dispersion measured using a Microtrac UPA150 particle size analyzer and viscosity greater than 10 centipoise as measured by a Brookfield viscometer.

TABLE 3.1

Formation and Stability of carbon black dispersions

| Example No. | Carbon Black Solids in Reaction (Wt. %) | First (Reaction) Temp. (° C.) | Sulfuric Acid | Neutralize Step | Hold Time at 90° C. (hrs) | 12 Month Stability Test |
|---|---|---|---|---|---|---|
| Comp. A | 7.5 | 55 | Yes | No | 0 | Fail |
| Comp. B | 7.5 | 55 | Yes | No | 0 | Fail |
| 3 | 7.5 | 55 | No | Yes | 10 | Pass |
| 4 | 21 | 55 | No | Yes | 10 | Pass |
| 5 | 7.5 | 55 | Yes | Yes | 10 | Pass |
| 6 | 15 | 65 | No | Yes | 5 | Pass |
| 7 | 7.5 | 75 | No | Yes | 10 | Pass |
| Comp. C | 7.5 | 75 | No | No | 0 | Fail |

Notes: "Hold time at 90° C." represents the optional step of the method wherein the neutralized reaction mixture is subjected to a second temperature (here, 90° C.) for a period of time.

The aqueous carbon black dispersions of this invention, Examples 3–7, pass the 12 month stability test.

EXAMPLE 8

Preparation of Slow Dry Inkjet Inks

All inks were made at 3 wt % carbon black solids. The amount of carbon black dispersion charged was based on the percent solids of the carbon black pigment dispersion. The slow dry ink included (all % on a weight basis based on the weight of the ink) 4.55% 2-pyrrolidone, 2.8% PEG-600, 5.25% 1,3 propanediol, 2.1% 1,5 pentanediol, 0.07% PLUROFAC™ D-25 (BASF Corp., Mount Olive, N.J.), the appropriate amount of carbon black dispersion, with the remainder being DI water. The inks were made by charging the organic components to well-stirred deionized water. The carbon black dispersion was charged last to the stirred mixture. The ink was filtered through a 1 micron glass fiber membrane filter (Acrodisc 25 mm syringe filter; Pall Corporation)

EXAMPLE 9

Preparation of Fast Dry Inkjet Inks

All inks were made at 3 wt % carbon black solids. The amount of carbon black dispersion charged was based on the percent solids of the carbon black pigment dispersion. The fast dry ink included (all % on a weight basis based on the weight of the ink) 7% sulfolane, 0.21% TEGO WET™ 500 (Goldschmidt Chemical Corp., Hopewell, Va.), the appropriate amount of carbon black dispersion, with the remainder being DI water. The inks were made by charging the organic components to well-stirred deionized water. The carbon black dispersion was charged last to the stirred mixture. The ink was filtered through a 1 micron glass fiber membrane filter (Acrodisc 25 mm syringe filter; Pall Corporation)

EXAMPLE 10

Evaluation of Slow and Fast Dry Inkjet Inks on Seven Paper Test Set

Carbon Black Dispersions, Examples 11–15, were Prepared According to the Method of Example 2; Their Characteristics are Presented in Table 10.1

Slow and fast dry inkjet inks were prepared according to Examples 8–9. The test inks were loaded in HP45A ink jet cartridges. The cartridges were loaded into a Hewlett Packard 895Cxi ink jet printer. Print test sheets were printed, allowed to dry and the optical density (OD) was measured with an X-Rite 500 Series spectrodensitometer. A seven paper test bed was used for print test sheets. The optical density was measured at several points on each print test sheet and the average was recorded. This test bed included a range of paper quality from specialty ink jet papers to recycled plain paper. The papers used were Kodak Bright White Inkjet Paper, HP Bright White Inkjet Paper, Hammermill CopyPlus®, Xerox Business Multipurpose 4200, Hp Printing Paper, Georgia-Pacific Eureka! Recycled Copier™, and Boise Cascade™Aspen™ Recycled. The optical density was measured at several points on each print test sheet and the average was recorded. The averages for each of the seven test papers recorded were then averaged to get a grand average for all seven test papers. This was done for both the slow and fast dry inks. Results are presented in Table 10.2.

TABLE 10.1

Characterization of carbon black dispersions

| Carbon Black Dispersion Ex. No. | Surface Area[1] (m2/gram) | Primary Particle Size[1] (nm) | DBP Uptake[1] | Dispersion Particle Size[1] (nm) |
|---|---|---|---|---|
| 11 | 100 | 25 | 115 | 217 |
| 12 | 110 | 24 | 114 | 187 |
| 13 | 110 | 24 | NA | 177 |
| 14 | NA | 20 | 114 | 167 |
| 15 | 220 | 16 | 112 | 138 |

Notes: 1. Surface area, primary particle size, and DBP uptake (in cc DBP per 100 g carbon black) values for the carbon black raw material used to make the oxidized carbon black dispersion were taken from the manufacturer's product technical literature.

2. Particle size given is the median volume particle size in nanometers and was run as the diluted dispersion on a UPA150 Microtrac Particle Size Analyzer.

TABLE 10.2

Evaluation of inkjet inks in prints

| Carbon Black Dispersion | Optical Density Fast Dry Ink Formulation | Optical Density Slow Dry Ink Formulation |
|---|---|---|
| Cab-O-Jet ™ 300 | 1.13 | 1.51 |
| Orient BonJet ™ CW-2 | 1.32 | 1.56 |
| Ex. 11 | 1.51 | 1.65 |
| Ex. 12 | 1.53 | 1.60 |
| Ex. 13 | 1.50 | 1.60 |
| Ex. 14 | 1.52 | 1.61 |
| Ex. 15 | 1.45 | NA |

Inkjet inks of the present invention including the carbon black dispersions of Examples 11–15 have significantly higher optical density in the fast dry ink formulation than do either of the commercial carbon black pigment dispersions.

EXAMPLE 16

Preparation of Carbon Black Dispersions Containing Added Surfactant

A carbon black dispersion, Example 17, was prepared accoding to Example 2. The indicated amount of surfactant was added to the carbon black dispersion and the dispersion (Examples 17a–17d) was then mixed or shaken overnight. Stability was determined on the dispersions; fast and slow dry inkjet inks were prepared according to Examples 8–9, printed and evaluated according to Example 10, with the results presented in Table 16.1.

TABLE 16.1

Carbon Black Dispersions with added surfactant

| Example No. | Wt % TERGITOL ™ 15-S-30 | 12 Month Stability Test[1] | Fast Dry Ink Optical Density | SlowDry Ink Optical Density |
|---|---|---|---|---|
| 17 | 0 | Fail | | |
| 17a | 0.25 | Borderline | | |
| 17b | 0.50 | Pass | 1.54 | 1.59 |

TABLE 16.1-continued

Carbon Black Dispersions with added surfactant

| Example No. | Wt % TERGITOL™ 15-S-30 | 12 Month Stability Test[1] | Fast Dry Ink Optical Density | SlowDry Ink Optical Density |
|---|---|---|---|---|
| 17c | 1.00 | Pass | | |
| 17d | 2.50 | Pass | 1.53 | 1.59 |

Notes: 1. Failure in stability test is defined as greater than 10% growth in the median volume particle size of the carbon black dispersion measured using a Microtrac UPA150 particle size analyzer and viscosity greater than 10 centipoise as measured by a Brookfield viscometer.

Added nonionic stabilizer (surfactant) improves the stability of the carbon black dispersions.

EXAMPLE 18

Formation of Carbon Black Dispersion For High Gloss Inks—Oxidation of Low Structure, Small Primary Particle Size Carbon Black 2000 g DI water is charged to a glass reaction kettle and the overhead stirrer is set to get good surface movement. 372 g potassium persulfate is charged to the stirred water in the reactor. 225 g carbon black (PRINTEX™ 85, DBP uptake=48 cc/100 g carbon black, primary particle diameter=16 nm) is charged to the reactor and the reactor temperature is brought to 55° C. and is maintained at 55° C. for 10 hours. Then the reactor is cooled to less than 35° C. Potassium hydroxide is added to adjust the pH to between 8 and 10. The resultant dispersion of carbon black particles is then heated to 90° C. and is held at that temperature for 10 hours. After the hold period, the reaction mixture is cooled to room temperature, is diluted 3- to 4-fold with DI water, and is filtered through a 140 mesh stainless steel screen. The filtered dispersion is treated by ultrafiltration to remove water phase inorganic and organic salts.

EXAMPLE 19

Preparation of Slow Dry Inkjet Ink Using High Gloss Carbon Black Dispersion

The ink is made at 3 wt % carbon black solids. The amount of carbon black dispersion charged is based on the percent solids of the carbon black pigment dispersion. The slow dry ink includes (all % on a weight basis based on the weight of the ink) 4.55% 2-pyrrolidone, 2.8% PEG-600, 5.25% 1,3 propanediol, 2.1% 1,5 pentanediol, 0.07% PLUROFAC™ D-25 (BASF Corp., Mount Olive, N.J.), the appropriate amount of carbon black dispersion, with the remainder being DI water. The inks are made by charging the organic components to well-stirred deionized water. The carbon black dispersion is charged last to the stirred mixture. The ink is filtered through a 1 micron glass fiber membrane filter (Acrodisc 25 mm syringe filter; Pall Corporation). The test ink is loaded in a HP45A ink jet cartridge. The cartridge is loaded into a Hewlett Packard 895Cxi ink jet printer and a test print is printed on Kodak Premium Picture Paper for Inkjet Prints. The gloss is expected to be significantly higher than the gloss of an equivalent test print prepared using the inks prepared with carbon black dispersions not prepared by the method of the second aspect of this invention.

What is claimed is:

1. A method for forming an aqueous carbon black dispersion comprising
providing a reaction mixture comprising carbon black having a primary particle diameter of less than 18 nanometers and a DBP uptake of less than 70 cc/100 g of said carbon black, a monovalent ion persulfate, and an aqueous medium;
subjecting said reaction mixture to a first temperature of from 40° C. to 90° C. for from 2 hours to 24 hours; and
adjusting said reaction mixture to a pH greater than 7.0.

2. A method for forming an aqueous carbon black dispersion comprising
providing a reaction mixture comprising carbon black having a DBP uptake of greater than 90 cc/100 g of said carbon black, a monovalent ion persulfate, a strong acid, and an aqueous medium;
subjecting said reaction mixture to a first temperature of from 40° C. to 90° C. for from 2 hours to 24 hours; and
adjusting said reaction mixture to a pH greater than 7.0.

3. A method for forming an aqueous carbon black dispersion comprising
providing a reaction mixture comprising carbon black having a DBP uptake of greater than 90 cc/100 g of said carbon black, a monovalent ion persulfate, and aqueous medium;
subjecting said reaction mixture to a first temperature of from 40° C. to 90° C. for from 2 hours to 24 hours;
adjusting said reaction mixture to a pH greater than 7.0; and
subjecting said reaction mixture to a second temperature of from 20° C. to 40° C. higher than said first temperature for from 2 hours to 12 hours.

4. A method for forming an aqueous carbon black dispersion comprising
providing a reaction mixture comprising carbon black having a DBP uptake of greater than 90 cc/100 g of said carbon black, a monovalent ion persulfate, and an aqueous medium;
subjecting said reaction mixture to a first temperature of from 40° C. to 90° C. for from 2 hours to 24 hours;
adjusting said reaction mixture to a pH greater than 7.0; and
adding an anionic or nonionic stabilizer either to the reaction before or after the pH adjustment step.

5. The method of claim 2 wherein said reaction mixture further comprises a strong acid.

6. The method of claim 2 further comprising, after said pH adjustment step, subjecting said reaction mixture to a second temperature of from 20° C. to 40° C. higher than said first temperature for from 2 hours to 12 hours.

7. The method of claim 2 further comprising adding an anionic or nonionic stabilizer.

8. An aqueous inkjet ink comprising an aqueous carbon black dispersion prepared by the method of
providing a reaction mixture comprising carbon black having a DBP uptake of greater than 90 cc/100 g of said carbon black, a monovalent ion persulfate, and an aqueous medium;
subjecting said reaction mixture to a first temperature of from 40° C. to 90° C. for from 2 hours to 24 hours; and
adjusting said reaction mixture to a pH treater than 7.0.

9. An aqueous inkjet ink comprising an aqueous carbon black dispersion prepared by the method of claim 2.

10. The aqueous ink of claim 8 further comprising an emulsion polymer.

11. The aqueous ink of claim 9 further comprising an emulsion polymer.

* * * * *